Patented June 6, 1939

2,161,389

UNITED STATES PATENT OFFICE 2,161,389

POLYNUCLEAR CYCLIC KETONES AND PROCESS OF PREPARING SAME

Leopold Ruzicka, Zurich, Switzerland, assignor to the firm of Society of Chemical Industry in Basle, Basel, Switzerland No Drawing. Application October 11, 1934, Serial No. 747,989. In Switzerland October 31, 1933

36 Claims. (Cl. 260—397)

This invention relates to the manufacture of polynuclear cyclic ketones by treating with an oxidizing agent, such as chromic acid, sterols or bile acids containing saturated nuclei, or derivatives and partial degradation products thereof, of which the hydroxyl groups in the nucleus have been withdrawn from oxidation, for instance by formation of esters, or have been exchanged as a whole, for instance for halogen; these cyclic ketones, which are accompanied by other degradation products, are formed owing to the breakage of the long side chains in the parent materials.

For isolating the cyclic ketones from the oxidation products, the neutral portions are separated in known manner, the volatile constituents being expelled, for example by steam or by heating in a vacuum. From the non-volatile neutral portions, after removal of the unchanged starting material by means of solvents, and if desired after previous distillation, the cyclic ketones are separated by means of ketone reagents and the products obtained are again converted into the ketones, the ester groups or halogens present being converted into hydroxyl groups if desired.

Suitable oxidising agents are, for example, chromic acid, permanganate, and the like. As ketone reagents, use may be made of semicarbazide, hydroxylamine, phenylhydrazine, diphenylhydrazine, mono- or dinitro-phenylhydrazine, phenylhydrazine-sulfonic acid, etc.

As parent materials there may be used besides any sterols, bile acids or the like, containing saturated nuclei, mixtures of such sterols or bile acids, preferably of corresponding stereo-chemical structure. The carboxylic groups of the bile acids are advantageously converted into other groups, for example alcoholic groups, before the oxidation; obviously other derivatives of sterols and bile acids, the long side chains of which are already in part degraded, may be subjected to the process.

In the literature oxidation reactions with sterols and hydrogenated sterols as well as bile acids and derivatives thereof have repeatedly been described, it is true, but all these reactions differ in a characteristic manner from the present process. With the known oxidations it was in general started either from sterols and bile acids or derivatives of these substances having free hydroxyl-groups, or else from such derivatives thereof in which the hydroxyl group or the hydroxyl groups were replaced by hydrogen. Obviously no oxyketones could thus be obtained. The formation of oxyketones is the more surprising as Windaus and Hossfeld, Zeitschrift für physiologische Chemie, volume 145 (1925), page 181, oxidize chlorocholestan, but indicate explicitly that the neutral portion obtained consists only of unaltered parent material.

The new compounds are related to the sexual hormones.

The formulas used in the description and in the claims correspond to the present knowledge, but, of course, the invention is not bound to the correctness of these structural formulas.

The following examples illustrate the invention, the parts being by weight:

Example 1

To a solution of 6 parts of dihydrocholesteryl-chloride in 250 parts of glacial acetic acid, there is run in the course of half-an-hour, while stirring, and at a temperature of 95–100° C., a solution of 13 parts of chromium trioxide in 50 parts of acetic acid of 80 per cent. strength, whereupon the whole is further heated for 6 hours. The excess of chromic acid is destroyed by addition of methanol and the solution strongly concentrated in a vacuum. The residue is diluted with water and extracted by means of ether. By shaking the ethereal extract with caustic potash solution of 10 per cent. strength, the acid portions are removed and the sparingly soluble potassium salt of chlorocholanic acid is precipitated. After evaporating the solvent from the neutral portions contained in the ethereal extract, the methyl-heptanone produced by the oxidation is distilled with steam. The products, separated from water, are extracted with cold methyl alcohol, ethyl alcohol or the like whereby the main quantity of unchanged parent material is left undissolved. The portion soluble in alcohol is caused, either directly or after previous fractional distillation in which the fraction boiling till about 230° C. (1 mm. pressure) is separately collected, to react with semicarbazide. The semicarbazone thus produced melts, after recrystallization from a mixture of alcohol and benzene, at 265–266° C. By heating this semicarbazone with hydrochloric acid of 20 per cent. strength for a short time on the water-bath the chloroketone is liberated. The crystallized product which has separated is extracted with ether, and after the solvent is expelled, is recrystallized from methanol, splendid crystals of melting point 128–129° C. being obtained. The chloroketone has the following constitution:

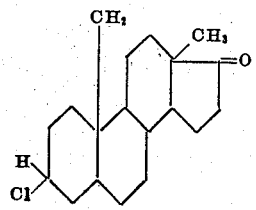

For the halogen there may be substituted in known manner an ester group or a hydroxyl-group.

The bromo- or iodo-ketones corresponding to the chloro-ketone, may be obtained by oxidation of dihydrocholesteryl-bromide or -iodide. As ketone reagent there may as well be used, for example, thiosemicarbazide instead of semicarbazide.

Example 2

84 parts of dihydrocholesteryl-acetate, dissolved in glacial acetic acid, are mixed drop by drop at 95° C., while stirring, with a solution of 123 parts of chromium trioxide in a mixture of glacial acetic acid and water (5:1). After heating for several hours the mixture of the oxidation is worked up according to Example 1. The acid portions are removed from the ethereal solution of the oxidation products by means of caustic soda solution, a sodium salt being separated which is soluble with difficulty only. The oily neutral products are liberated from the volatile portions by heating to 100° C. at 12 mm pressure. After the product has been taken up in alcohol, unaltered dihydrocholesteryl-acetate separates in crystalline form. The residue remaining after distillation of the filtered alcoholic solution is then heated with an alcoholic solution of semicarbazide, and the precipitate separated in the cold washed with ether and boiled out with water. After recrystallization from alcohol the semicarbazone melts at 261 to 262° C. In this manner the semi-carbazone $C_{22}H_{35}O_3N_3$ of the keto-acetate $C_{21}H_{32}O_3$ is obtained. After heating the semi-carbazone with a mixture of equal parts of concentrated hydrochloric acid and glacial acetic acid, or with a concentrated solution of oxalic acid, and after saponification of the scission product by boiling with an alcoholic caustic soda solution, the hydroxy-ketone is taken up in ether, washed out, and the ether expelled. By recrystallization from aqueous alcohol or from a mixture of acetic ester and benzine, the new hydroxy-ketone $C_{19}H_{30}O_2$ is obtained in beautiful crystals melting at 174–175° C. $[\alpha]_D=+87°$ in methanol. The hydroxy-ketone corresponds to the following formula:

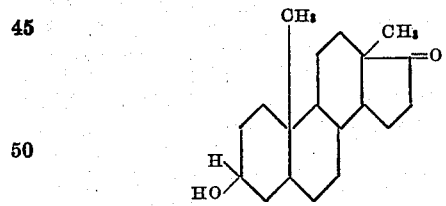

The acetate of this hydroxy-ketone melts at 96—97° C. and the oxime at 185–186° C.

Example 3

Epi-dihydrocholesteryl-acetate is oxidized with chromic acid in the manner described in Examples 1 and 2 and the product is similarly worked up. The semi-carbazone of the keto-acetate melts at 273° C. and the hydroxy-ketone at 183° C. The acetoxy-ketone melts at 164–165° and the oxime of the hydroxy-ketone at 214–215° (clear at 218°). The specific rotation of this hydroxy-ketone in methyl alcohol is $[\alpha]_D=+103°$ and in absolute ethyl alcohol $[\alpha]_D=+94.6°$.

The same hydroxy-ketone may be obtained for instance by oxidizing epi-dihydrocholesteryl-propionate or -benzoate. The propionate of the hydroxy-ketone melts at 151–152° C.

Example 4

Example 2 or 3 is carried out with the use of potassium permanganate instead of chromium trioxide. The necessary proportion by weight of this oxidizing agent amounts to about one and a half times that of the chromium trioxide.

Example 5

Dihydro-sitosteryl-acetate is subjected to oxidation as described in Examples 1 and 2. The semi-carbazone of the keto-hydroxy-acetate separated from the reaction product melts at 261° C., and a mixture of the body with the product of the same melting point of Example 2 does not show any depression.

Example 6

Coprosteryl-acetate is oxidized with chromic acid as described in Examples 1 and 2 and the oxidation product is further worked up as therein described. The semi-carbazone of the keto-hydroxy-acetate so obtained melts at 245°. The acid and alkaline saponification of the latter leads to the corresponding hydroxy-ketone of melting point 151–152°.

Example 7

By the methods described in the preceding Examples also epi-coprosteryl-acetate may be oxidized. The semi-carbazone of the keto-hydroxy-acetate obtained melts at 254–255° and the hydroxy-ketone produced therefrom at 150–151°.

Example 8

From the lithocholic acid ester there is prepared in known manner according to the method of Bouveault, by the action of a great excess of sodium in an absolute alcoholic solution, the corresponding diol melting at 179–180°. By the treatment of this diol with acetic anhydride there is obtained the diacetylated compound. 15 parts of this diacetate, dissolved in 730 parts of glacial acetic acid, are then oxidized with 22 parts of chromium trioxide in 270 parts of aqueous acetic acid of 90 per cent. strength according to the process described in Example 1. The semi-carbazone of the keto-acetate obtained melts at 254–255°, and is, as well as the hydroxy-ketone obtained therefrom, identical with the compounds described in Example 7 prepared from epicoprosteryl-acetate as regards their melting points and their mixed melting points.

Example 9

Acetyl-lithocholic acid or its ester is oxidized according to the method described in Example 1, the same result being obtained as in Examples 7 and 8.

Example 10

The neutral oxidation products of the epi-dihydro-cholesteryl-acetate of Example 3, after separation of the unaltered parent material by crystallization from alcohol, may also be treated with other ketone reagents than that given in this example. 100 grams of the neutral oil may for instance be boiled for some hours with 20 grams of the chlorohydrate of hydroxylamine and 40 grams of sodium acetate in 1 liter of alcohol of 95 per cent. strength. After cooling, the oxime of the acetoxy-ketone which is sparingly soluble, separates from the alcoholic solution. By concentration of the mother liquor of this precipitate and allowing to stand a further quantity of this oxime may be obtained which melts after recrystallization from methyl alcohol at about 215° with decomposition. By boiling this oxime with an alcoholic solution of oxalic acid and, if necessary, for complete saponification, with an alcoholic potassium solution, the hydroxy-ketone melting at 183° is obtained.

What I claim is:

1. Process for the production of polynuclear substituted cyclic ketones having a cyclo-pentano-polyhydrophenanthrene nucleus, comprising treating compounds of the formula

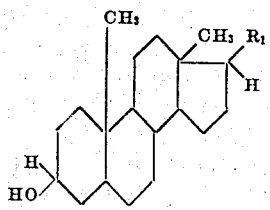

wherein $R_1$ stands for a member of the group consisting of alkyl and alkyl substituted by oxygen, with an oxidizing agent selected from the group consisting of chromium trioxide and permanganate, the hydroxyl group of said compounds being protected from oxidation by replacement by a substituent which is unaffected by the oxidizing agent and reconvertible to a hydroxyl group after oxidation, separating the non-volatile neutral portions of the resultant oxidation products, and isolating the said cyclic ketones from the said neutral portions.

2. Process for the production of polynuclear substituted cyclic ketones having a cyclo-pentano-polyhydrophenanthrene nucleus, comprising treating compounds of the formula

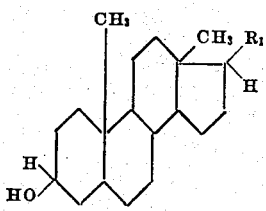

wherein $R_1$ stands for a member of the group consisting of alkyl and alkyl substituted by oxygen, with an oxidizing agent selected from the group consisting of chromium trioxide and permanganate, the hydroxyl group of said compounds being protected from oxidation by esterification, separating the non-volatile neutral portions of the resultant oxidation products, and isolating the said cyclic ketones from the said neutral portions.

3. Process for the production of polynuclear substituted cyclic ketones having a cyclo-pentano-polyhydrophenanthrene nucleus, comprising treating compounds of the formula

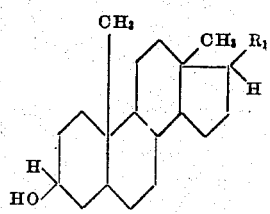

wherein $R_1$ stands for a member of the group consisting of alkyl and alkyl substituted by oxygen, with an oxidizing agent selected from the group consisting of chromium trioxide and permanganate, the hydroxyl group of said compounds being protected from oxidation by replacement by halogen, separating the non-volatile neutral portions of the resultant oxidation products, and isolating the said cyclic ketones from the said neutral portions.

4. Process for the production of polynuclear substituted cyclic ketones having a cyclo-pentano-polyhydrophenanthrene nucleus, comprising treating compounds of the formula

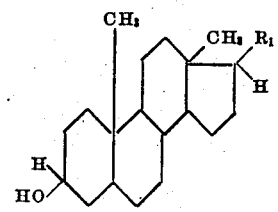

wherein $R_1$ stands for a member of the group consisting of alkyl and alkyl substituted by oxygen, with an oxidizing agent selected from the group consisting of chromium trioxide and permanganate, the hydroxyl group of said compounds being protected from oxidation by its replacement by a group which, upon hydrolysis, is converted into a hydroxyl group, separating the non-volatile neutral portions of the resultant oxidation products, and isolating the said cyclic ketones from the said neutral portions.

5. In the process for the production of polynuclear substituted cyclic ketones having a cyclo-pentano-polyhydrophenanthrene nucleus by the oxidation of a compound of the formula

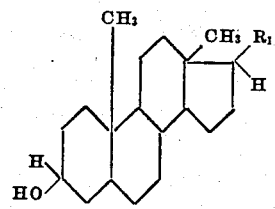

wherein $R_1$ stands for a member of the group consisting of alkyl and alkyl substituted by oxygen, the hydroxyl group of said compounds being replaced by a non-oxidizable substituent during the oxidation, said substituent being reconvertible to a hydroxy group after oxidation, the step of isolating said cyclic ketones from the non-volatile neutral oxidation products obtained from the oxidation by separation of difficultly soluble derivatives.

6. Process for the production of polynuclear substituted cyclic ketones having a cyclo-pentano-polyhydrophenanthrene nucleus, comprising treating compounds of the formula

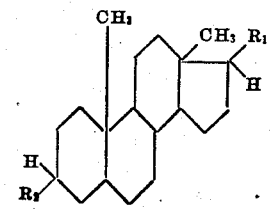

wherein $R_1$ stands for a member of the group consisting of alkyl and alkyl substituted by oxygen, and $R_2$ for a member of the group consisting of esterified hydroxyl and halogen, with an oxidizing agent selected from the group consisting of chromium trioxide and permanganate, separating the non-volatile neutral portions of the resultant oxidation products, and isolating the said cyclic ketones from the said neutral portions.

7. Process for the production of polynuclear substituted cyclic ketones having a cyclo-pentanopolyhydro-phenanthrene nucleus, comprising treating compounds of the formula

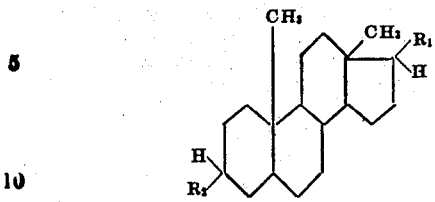

wherein $R_1$ stands for a member of the group consisting of alkyl and alkyl substituted by oxygen, and $R_2$ for a member of the group consisting of esterified hydroxyl and halogen, with an oxidizing agent selected from the group consisting of chromium trioxide and permanganate, separating condensation products of the said cyclic ketones from the non-volatile neutral portion of the resultant oxidation products by condensation with ketone reagents, and regenerating the free cyclic ketones from the said condensation products by treatment with hydrolizing agents.

8. Process for the production of polynuclear substituted cyclic ketones having a cyclo-pentano-polyhydro-phenanthrene nucleus, comprising treating compounds of the formula

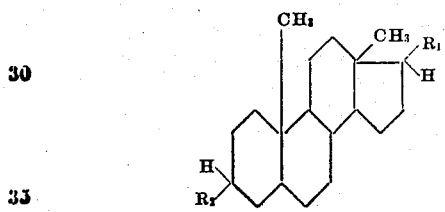

wherein $R_1$ stands for a member of the group consisting of alkyl and alkyl substituted by oxygen, and $R_2$ for a member of the group consisting of esterified hydroxyl and halogen, with chromium trioxide, separating condensation products of the said cyclic ketones from the non-volatile neutral portion of the resultant oxidation products by condensation with ketone reagents, and regenerating the free cyclic ketones from the said condensation products by treatment with hydrolizing agents.

9. Process for the production of polynuclear substituted cyclic ketones having a cyclo-pentano-polyhydro-phenanthrene nucleus, comprising treating compounds of the formula

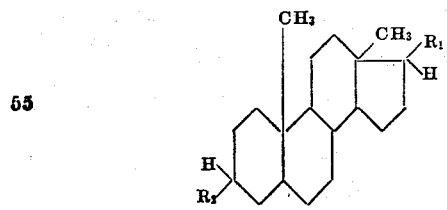

wherein $R_1$ stands for a member of the group consisting of alkyl and alkyl substituted by oxygen, and $R_2$ for a member of the group consisting of esterified hydroxyl and halogen, with chromium trioxide, separating the neutral oxidation products, expelling therefrom volatile constituents and removing any residual parent material by crystallization from an organic solvent, separating condensation products of the said cyclic ketones from the resultant purified neutral oxidation products by condensation with ketone reagents, and regenerating the free cyclic ketones from the said condensation products by treatment with hydrolizing agents.

10. Process for the production of polynuclear substituted cyclic ketones having a cyclo-pentano-polyhydro-phenanthrene nucleus, comprising treating compounds of the formula

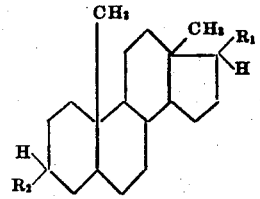

wherein $R_1$ stands for a member of the group consisting of alkyl and alkyl substituted by oxygen, and $R_2$ for a member of the group consisting of esterified hydroxyl and halogen, with an oxidizing agent selected from the group consisting of chromium trioxide and permanganate, separating the said cyclic ketones from the non-volatile neutral oxidation products thus obtained by treatment with semicarbazide, whereby they are converted into semicarbazones, and regenerating the free cyclic ketones from said semicarbazones by means of hydrolizing agents.

11. Process for the production of polynuclear substituted cyclic ketones having a cyclo-pentano-polyhydro-phenanthrene nucleus, comprising treating sterols containing no double bonds in the ring system with an oxidizing agent selected from the group consisting of chromium trioxide and permanganate, the hydroxyl groups of said sterols being replaced by nonoxidizable substituents during the oxidation, said substituents being reconvertible to hydroxyl groups after oxidation, separating the non-volatile neutral portions of the resultant oxidation products, and isolating the said cyclic ketones from the said neutral portions.

12. Process for the production of polynuclear substituted cyclic ketones having a cyclo-pentano-polyhydro-phenanthrene nucleus, comprising treating sterols containing no double bonds in the ring system with an oxidizing agent selected from the group consisting of chromium trioxide and permanganate, the hydroxyl groups of said sterols being protected from oxidation by esterification, separating the non-volatile neutral portions of the resulting oxidation products, and isolating the said cyclic ketones from the said neutral portions.

13. Process for the production of polynuclear substituted cyclic ketones having a cyclo-pentano-polyhydro-phenanthrene nucleus, comprising treating sterols containing no double bonds in the ring system with an oxidizing agent selected from the group consisting of chromium trioxide and permanganate, the hydroxyl groups of said sterols being protected from oxidation by replacement by halogen, separating the non-volatile neutral portions of the resultant oxidation products, and isolating the said cyclic ketones from the said neutral portions.

14. Process for the production of polynuclear substituted cyclic ketones having a cyclo-pentano-polyhydro-phenanthrene nucleus, comprising treating sterols containing no double bonds in the ring system with an oxidizing agent selected from the group consisting of chromium trioxide and permanganate, the hydroxyl groups of the said sterols being protected from oxidation by replacement thereof by a group which, upon hydrolysis, is converted into a hydroxyl group, separating the non-volatile neutral portions of the resultant oxidation products, and isolating the said cyclic ketones from the said neutral portions.

15. Process for the production of polynuclear cyclic ketones having a cyclo-pentano-polyhydro phenanthrene nucleus, comprising treating a sterol of the formula

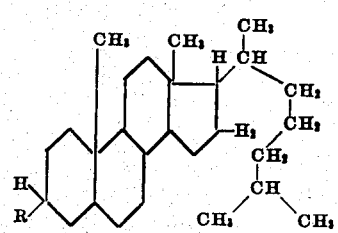

wherein R stands for a member of the group consisting of esterified hydroxyl and halogen, with an oxidizing agent selected from the group consisting of chromium trioxide and permanganate, and separating the said cyclic ketones from the non-volatile neutral oxidation products thus obtained.

16. Process for the production of polynuclear cyclic ketones having a cyclo-pentano-polyhydrophenanthrene nucleus, comprising treating a sterol of the formula

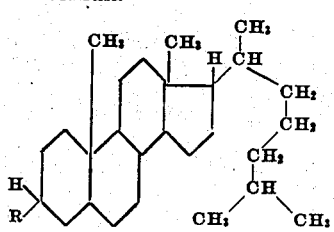

wherein R stands for a member of the group consisting of esterified hydroxyl and halogen, with an oxidizing agent selected from the group consisting of chromium trioxide and permanganate, separating condensation products of the said cyclic ketones from the non-volatile neutral oxidation products thus obtained, and regenerating the free cyclic ketones from the said condensation products by means of hydrolizing agents.

17. Process for the production of polynuclear cyclic ketones having a cyclo-pentano-polyhydrophenanthrene nucleus comprising treating an ester of epi-dihydrocholesterol with an oxidizing agent selected from the group consisting of chromium trioxide and permanganate, and isolating the said cyclic ketones from the non-volatile neutral oxidation products thus obtained.

18. Process for the production of a polynuclear cyclic ketone having a cyclo-pentano-polyhydrophenanthrene nucleus comprising treating epi-dihydrocholesteryl-acetate with an oxidizing agent selected from the group consisting of chromium trioxide and permanganate, separating the said cyclic ketone from the non-volatile neutral oxidation products thus obtained by means of a ketone reagent, and regenerating the free cyclic ketone from the resultant ketone derivative by means of hydrolizing agents.

19. Process for the production of a polynuclear cyclic ketone having a cyclo-pentano-polyhydrophenanthrene nucleus comprising treating epi-dihydrocholesteryl-acetate with chromium trioxide, removing the acid oxidation products with alkaline reagents, expelling volatile constituents from the neutral oxidation products and removing any residual parent material by crystallization from organic solvents, separating the said cyclic ketone by means of semi-carbazide, and regenerating the free cyclic ketone from the resultant semicarbazone by means of hydrolizing agents.

20. Process for the production of a polynuclear cyclic ketone having a cyclo-pentano-polyhydrophenanthrene nucleus comprising treating an ester of dihydrocholesterol with an oxidizing agent selected from the group consisting of chromium trioxide and permanganate, and isolating the said cyclic ketone from the non-volatile neutral oxidation products thus obtained.

21. Process for the production of a polynuclear cyclic ketone having a cyclo-pentano-polyhydrophenanthrene nucleus comprising treating dihydrocholesteryl-acetate with an oxidizing agent selected from the group consisting of chromium trioxide and permanganate, separating the said cyclic ketone from the non-volatile neutral oxidation products thus obtained by means of a ketone reagent, and regenerating the free cyclic ketone from the resultant ketone derivative by means of hydrolizing agents.

22. Process for the production of a polynuclear cyclic ketone having a cyclo-pentano-polyhydrophenanthrene nucleus comprising treating dihydrocholesteryl-acetate with chromium trioxide, removing the acid oxidation products with alkaline reagents, expelling volatile constituents from the neutral oxidation products and removing any residual parent material by crystallization from organic solvents, separating the said cyclic ketone by means of semi-carbazide, and regenerating the free cyclic ketone from the resultant semicarbazone by means of hydrolizing agents.

23. Process for the production of a polynuclear cyclic ketone having a cyclo-pentano-polyhydrophenanthrene nucleus comprising treating dihydrocholesteryl-chloride with chromium trioxide, removing the acid oxidation products with alkaline reagents, expelling volatile constituents from the neutral oxidation products and removing any residual parent material by crystallization from organic solvents, separating the said cyclic ketone by means of semi-carbazide, and regenerating the free cyclic ketone from the resultant semicarbazone by means of hydrolizing agents.

24. Process for the production of a polynuclear substituted cyclic ketone having a cyclo-pentano-polyhydro-phenanthrene nucleus, comprising treating a compound of the formula

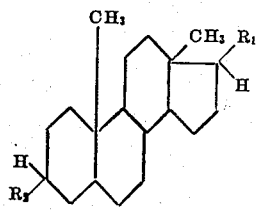

wherein $R_1$ stands for an alkyl group substituted by oxygen, and $R_2$ for a group, which upon hydrolysis, is converted into a hydroxyl group, with an oxidizing agent selected from the group consisting of chromium trioxide and permanganate, separating the non-volatile neutral portions of the resultant oxidation products, and isolating the said cyclic ketone from the said neutral portions.

25. Process for the production of a polynuclear substituted cyclic ketone having a cyclo-pentano-polyhydro-phenanthrene nucleus, comprising treating a compound of the formula

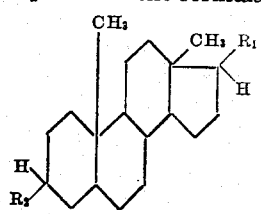

wherein R₁ stands for an alkyl group substituted by oxygen, and R₂ for an esterified hydroxyl group with an oxidizing agent selected from the group consisting of chromium trioxide and permanganate, separating the non-volatile neutral portions of the resultant oxidation products, and isolating the said cyclic ketone from the said neutral portions.

26. Process for the production of a polynuclear substituted cyclic ketone having a cyclo-pentano-polyhydro-phenanthrene nucleus, comprising treating a compound of the formula

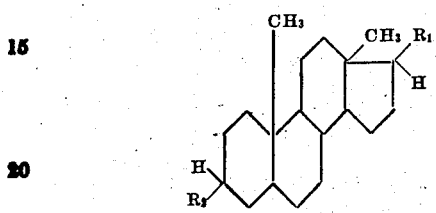

wherein R₁ stands for an alkyl group substituted by oxygen, and R₂ for an esterified hydroxyl group, with an oxidizing agent selected from the group consisting of chromium trioxide and permanganate, separating a condensation product of the said cyclic ketone from the non-volatile neutral portion of the resultant condensation products by condensation with a ketone reagent, and regenerating the free cyclic ketone from the said condensation product by treatment with hydrolizing agents.

27. Process for the production of a polynuclear substituted cyclic ketone having a cyclo-pentano-polyhydro-phenanthrene nucleus, comprising treating a compound of the formula

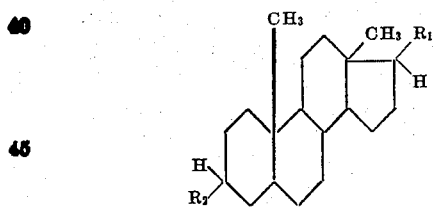

wherein R₁ stands for an alkyl group substituted by oxygen, and R₂ for an esterified hydroxyl group, with chromium trioxide, separating a condensation product of the said cyclic ketone from the non-volatile neutral portion of the resultant condensation products by condensation with a ketone reagent, and regenerating the free cyclic ketone from the said condensation product by treatment with hydrolizing agents.

28. The products of the formula

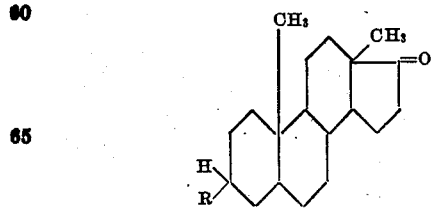

wherein R is a member selected from the group consisting of hydroxyl, esterified hydroxyl and halogen, and which correspond stereochemically to compounds of the group of sterols consisting of dihydro-cholesterol and the isomeric coprosterols.

29. The product of the formula

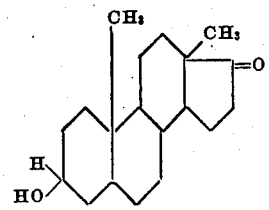

melting at 174–175° C., forming a semicarbazone melting at 261–262° C., and acetate melting at 96–97° C., and corresponding stereo-chemically to dihydro-cholesterol, which product is useful in therapeutics.

30. The product of the formula

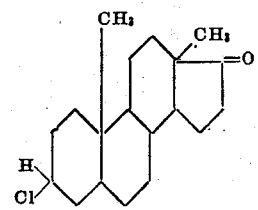

melting at 128–129° C. and forming a semicarbazone melting at 265–266° C., which product is useful in therapeutics.

31. The product of the formula

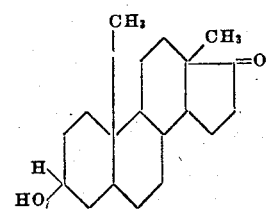

melting at 150–151° C., forming a semi-carbazone melting at 254–255° C., and corresponding stereo-chemically to epi-coprosterol, which product is useful in therapeutics.

32. Process for the production of a polynuclear cyclic ketone having a cyclopentano-polyhydro-phenanthrene nucleus comprising oxidizing dihydrocholesteryl acetate with chromium trioxide, separating the said cyclic ketone from the non-volatile neutral oxidation products thus obtained by means of a ketone reagent, and regenerating the free cyclic ketone from the resultant ketone derivatives by hydrolyzing agents.

33. Process for the production of polynuclear substituted cyclic ketones having a cyclo-pentan-polyhydro-phenanthrene nucleus, comprising treating compounds of the formula

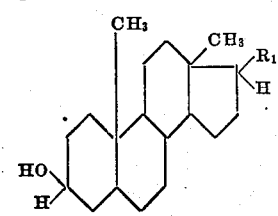

wherein R₁ stands for an alkyl group, with an oxidizing agent selected from the group consisting of chromium trioxide and permanganate, the hydroxyl group of said compounds being protected from oxidation by replacement by a substituent which is unaffected by the oxidizing agent and reconvertible to a hydroxyl group after the oxidation, separating the non-volatile neutral portions of the resultant oxidation products, and isolating the said cyclic ketones from the said neutral portions.

34. Process for the production of polynuclear substituted cyclic ketones having a cyclo-pentano-polyhydrophenanthrene nucleus, comprising oxidizing compounds of the formula

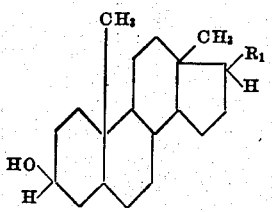

wherein $R_1$ stands for an alkyl group, with an oxidizing agent capable of splitting up —C—C— bonds, the hydroxy group of the said compounds being protected from oxidation by replacement by a substituent which is unaffected by the oxidizing agent and reconvertible to a hydroxyl group after the oxidation, whereby the said alkyl group is replaced by ketonic oxygen, separating the neutral portions of the resultant oxidation products, and isolating the said cyclic ketones from the said neutral portions.

35. The product of the formula

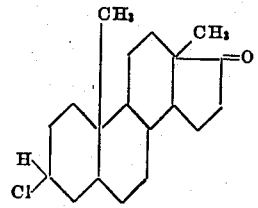

36. Process for the production of polynuclear substituted ketones having a cyclo-pentano-polyhydrophenanthrene nucleus, comprising treating sterols containing no double bonds in the ring system with chromium trioxide, the hydroxyl groups of said sterols being protected from oxidation by replacement by halogen, and isolating the resultant cyclic ketones.

LEOPOLD RUZICKA.